United States Patent [19]

Bhansali

[11] 4,181,523

[45] Jan. 1, 1980

[54] NICKEL-BASE WEAR-RESISTANT ALLOY

[76] Inventor: Kirit J. Bhansali, 1512 Pontiac Dr., Kokomo, Ind. 46901

[21] Appl. No.: 949,830

[22] Filed: Oct. 10, 1978

[51] Int. Cl.$^2$ ............................................ C22C 19/05
[52] U.S. Cl. ........................................ 75/171; 75/176
[58] Field of Search ......................... 75/171, 170, 176; 148/32, 32.5

[56] References Cited

U.S. PATENT DOCUMENTS 2,744,009   5/1956   Bowne et al. .......................... 75/171

*Primary Examiner*—R. Dean

[57] ABSTRACT

A nickel-base wear-resistant alloy is disclosed. The alloy contains as its principal alloying elements, chromium, boron, silicon and carbon; other elements may be present as optional additions or as impurities. The alloy has an outstanding combination of resistance to various wear mechanisms and various corrosion media.

10 Claims, No Drawings

NICKEL-BASE WEAR-RESISTANT ALLOY

This invention relates to nickel-base alloys for use as wear-resistant articles, and more specifically, to nickel-base alloys containing chromium and metal compounds.

Components of various industrial items (such as engines, machines and apparatus) that are subject to wear are constantly under study for improvement. For many years, improvements have been made in alloy compositions, coatings, heat treatments and designs to avoid excessive wear of such articles. In some cases, the article is made entirely of a wear-resistant alloy as a casting or wrought product. In other cases, the article is made of a low cost and/or high strength base alloy and then coated (hardfaced) or plated with a wear-resistant alloy at the critical areas of wear. The coating or plating operation may be performed before or after the article is placed in service.

For many years, cobalt-base alloys were especially suited for such applications, for example, certain alloys manufactured under Cabot Corporation's registered trademark HAYNES STELLITE ®. Recently, some nickel- and iron-base alloys have been developed to fill this need. Representative prior art alloys are described in Table 1. All compositions in this specification and claims are given in percent by weight (w/o) unless otherwise stated. These alloys are generally available in many forms and especially in the form of welding rods for use in hardfacing articles subjected to wear. The cobalt-base alloys are the HAYNES STELLITE ® alloys that have been well known in the art for over 70 years. These alloys depend principally on their chromium and tungsten contents together with carbon to form metal carbides in a cobalt matrix for their outstanding properties. Alloy C-1 of Table 1 is a representative alloy of this class. Table 1 also lists some iron- and nickel-base alloys now available as wear-resistant articles.

U.S. Pat. No. 4,075,999, granted to L. J. Danis, discloses a series of nickel-base, wear-resistant coatings on components of internal combustion engines. The coatings of the Danis U.S. Pat. No. 4,075,999 consist of nickel-base alloys with critical contents of molybdenum, chromium and carbon to form metal carbides in the nickel matrix to obtain the desired engineering properties. Alloy N-E in Table 1 is a typical coating composition of the Danis U.S. Pat. No. 4,075,999.

U.S. Pat. No. 2,699,993, granted to S. G. MacNeill, appears to be an early attempt to provide wear-resistant nickel-base alloys. The alloy disclosed in the MacNeill U.S. Pat. No. 2,699,993 is a low chromium, high tungsten and cobalt containing nickel-base alloy. Alloy N-42 in Table 1 is a typical alloy of the MacNeill U.S. Pat. No. 2,699,993.

U.S. Pat. No. 3,068,096, granted to J. K. Elbaum, discloses a nickel-base alloy with molybdenum, cobalt and tungsten each at 10% content. Alloy N-208 in Table 1 is an example of the alloy of U.S. Pat. No. 3,068,096.

U.S. Pat. No. 2,864,696, granted to J. W. Foreman, discloses a nickel-base alloy containing significant contents of copper and molybdenum, less than 25% chromium and 5 to 20% silicon.

These prior art patents cited above relate to articles that are within the same class of alloys as the alloy of the present invention. They are essentially nickel-base alloys containing chromium for use in wear-resistant applications. Each of the prior art alloys, listed in Table 1, generally is characterized by a high degree of hardness; however, all of the prior art alloys do not possess good hot hardness properties. Because of the various compositions, the prior art alloys vary in degree of corrosion resistance under a variety of corrosive media. Furthermore, the degree of wear resistance of the prior art alloy may vary depending upon the type of wear experienced, i.e., abrasive or adhesive wear.

Alloys of the prior art cited above generally contain, in appreciable amounts, one or more of the metals cobalt, tungsten, molybdenum and others. These metals have become extremely costly and/or are in short supply because of their strategic classification.

The problem of wear in industrial and commercial articles has become more publicized in recent years. We have now become more aware of the need for alloys that resist the various types of wear. Until recently, it was generally established that hardness alone was the measure of wear. A hard material was presumed to be a wear-resistant material. The harder the material, the more wear resistance. This belief has been overcome as a result of new wear testing procedures that have been developed. It was found necessary to test a variety of types of wear, for example, adhesive and abrasive wear. Furthermore, some alloys may resist adhesive wear but not abrasive wear, and, of course, the reverse is true. Adhesive and abrasive wear tests will be described hereinafter.

Certain international political and economic events affecting the cobalt ore producing mines in Africa have created uncertainties in the future availability of cobalt. Because of the present short supply and uncertain future, cobalt prices have spiraled drastically. These additional inflated prices of imported cobalt, inter alia, also contribute to an unfavorable balance of trade for the United States economy. For these reasons, reduced cobalt use is essential in the metals industry.

It is a principal object of this invention to provide an alloy with an optimum combination of engineering properties including resistance to various corrosion and wear conditions, and hot hardness.

It is another significant object of this invention to provide an alloy containing a minimum content of costly and strategic metals in short supply.

These and other objects and benefits are provided by the alloy of this invention as disclosed in Table 2.

The alloy of this invention is nickel base and contains chromium, boron, carbon and silicon as the principal elements. The other elements mentioned in Table 2 are not required as essential elements in the alloy. They may be present in minor amounts as a result of impurities adventitiously present in scrap and/or raw materials that may be used in the melting of this class of alloy. One or more of these elements may be added to the alloy for certain benefits as may be required on occasion. Molybdenum and tungsten, combined, must not total over 2.5% and preferably not over 1.5%. The total contents of vanadium, tantalum, columbium, titanium, and manganese must not exceed 4% and preferably not exceed 3%.

Cobalt must not exceed 7.5% and preferably not exceed 5% in the alloy. It is well known that cobalt occasionally may be present in the scrap and raw materials used in the melting of the alloy.

Iron also is an impurity that may be tolerated up to about 5% and preferably to about 4% maximum.

Silicon is required in the alloy, preferably between 3 and 5% for most uses. However, in the production of castings and in the form of welding materials for TIG welding, it was determined that silicon may be as low as only 0.25% for best results.

Chromium is the predominant element in the nickel-base alloy, being present in the range 35 to 50 w/o and preferably 42.5 to 47.5 w/o. Although the exact mechanism is not completely understood, it is believed that outstanding engineering properties result from a very effective combination of metal compounds (i.e., borides, silicides, carbides) of metals present in the alloy, principally nickel and chromium. In general, chromium is usually present in the alloy in approximately equal amounts as nickel. For best results, the ratio of chromium-to-nickel must be within the ratios of 1 to 1.25 and 1 to 0.75.

Carbon must be present in the alloy within the range 0.1 to 1.0 w/o and preferably 0.3 to 0.45 w/o. Carbon serves to form effective metal carbides in the alloy. Higher carbon levels are not recommended. Increased carbon will tend to embrittle the alloy and/or produce excessive carbides, thus deleteriously affect the desired optimum balance of borides and silicides.

Boron is a critical element in the alloy of this invention within the range 0.65 to 3% and preferably 1.2 to 2.5%.

Less than about 0.65% boron will not provide an adequate combination of compounds, including borides, in the alloy as required for optimum engineering characteristics. More than about 3% boron will yield an over-balance of borides which (together with the carbides and silicides) may embrittle the alloy excessively. The choice of boron content will vary depending upon the end use of the alloy and the total content of boron, carbon, and silicon in the alloy. Therefore, for some uses, to avoid excessive embrittlement in the alloy, the total content of boron, carbon, and silicon should not exceed about 7.5%.

Copper may be present in the alloy up to 2.5% to enhance resistance to sulfuric acid, as is well known in the art.

TABLE 1

TYPICAL COMPOSITIONS OF PRIOR ART ALLOYS
in weight percent

| ALLOY | Ni | Cr | Mo | Fe | W | C | Si | Co | B | V |
|---|---|---|---|---|---|---|---|---|---|---|
| C-6 | 3* | 28 | 1* | 3* | 4 | 1.1 | 1.0 | Bal | — | — |
| C-1 | — | 30 | — | — | 12 | 2.5 | — | Bal | — | — |
| C-12 | — | 29 | — | 5.0 | 8 | 1.25 | — | Bal | — | — |
| N-41 | Bal | 12 | — | 3.0 | — | .35 | 3.5 | — | 2.5 | — |
| N-E | Bal | 29 | 5.0 | 3.0 | — | 2.5 | 1.0 | — | — | — |
| N-711 | (Ni + Co) Bal | 27 | 10 | 23 | — | 2.7 | — | Ni + Co Bal | — | — |
| N-42 | Bal | 14 | — | 2 max | 14 | .8 | .5 | 15 | 3.0 | — |
| N-208 | Bal | 26 | 10 | 12.5 | 10 | 1.4 | .7 | 10 | — | — |
| F-1016 | 10 | 25 | 5.5 | Bal | — | 1.8 | .8 | — | — | — |
| F-93 | — | 17 | 16 | Bal | — | 3 | — | 6.5 | — | 1.9 |
| CRM | — | 18 | 3.25 | Bal | 2.25 | 3.25 | 1.1 | 1.0 | — | 1.25 |

TABLE 2

ALLOYS OF THIS INVENTION
COMPOSITION
in weight percent, w/o

| | BROAD RANGE | PREFERRED RANGE | TYPICAL |
|---|---|---|---|
| Chromium | 35–50 | 42.5–47.5 | 45 |
| Mo plus W | 2.5 max | 1 max | 1 max |
| Boron | .65–3 | 1.2–2.5 | 1.85 |
| Carbon | .1–1.0 | .3–.45 | .4 |
| Silicon | .25–5.0 | 3–5 | 3.5 |
| Iron | 5 max | 4 max | 4 max |
| Cobalt | 7.5 max | 5 max | 5 max |
| Nickel and incidental impurities | Bal | Bal | Bal |
| V—Ta—Cb—Ti—Mn | 4 max | 3 max | 3 max |
| As Cast Hardness Rockwell C | 36 min | 36 min | 36 min |
| Copper | up to 2.5 | up to 2.5 | up to 2 |

TABLE 3

EXPERIMENTAL ALLOYS
COMPOSITION
in weight percent w/o

| ALLOY NO. | Cr | C | Si | B |
|---|---|---|---|---|
| E-1 | 12 | About .1 | About .25 | About .03 |
| E-2 | 20 | About .1 | About .25 | .25 |
| E-3 | 27 | About .1 | About .25 | .8 |
| E-4* | 35 | About .1 | About .25 | 1.36 |
| E-5* | 45 | About .1 | About .25 | 1.68 |
| E-66 | 20 | About .1 | 1.45 | About .03 |
| E-67 | 20 | About .1 | 2.5 | About .03 |
| E-68 | 30 | About .1 | 3.5 | About .03 |
| E-69 | 30 | About .1 | 6.2 | About .03 |
| E-70 | 24 | About .1 | 4.0 | About .03 |
| E-N-1* | 45 | .4 | 3.5 | 1.85 |

*Alloys of this invention
All alloys contain
less than 2.5 Mo + W
less than 5 Iron
less than 4 V + Ta + Cb + Ti + Mn
less than 7.5 Co
less than 2.5 Copper
Balance Ni + impurities

TABLE 4

HARDNESS AND WEAR PROPERTIES
OF EXPERIMENTAL ALLOYS

ADHESIVE WEAR, VOLUMES ($mm^3$)
per load

| ALLOY NO. | 30 lbs. | 90 lbs. | 150 lbs. | 210 lbs. | 300 lbs. |
|---|---|---|---|---|---|
| E-1 | 0.217 | 0.315 | 0.764 | 1.68 | over 45.0 |
| E-2 | 0.165 | 0.291 | 0.386 | 0.536 | 7.8 |
| E-3 | 0.57 | 0.574 | 0.886 | 0.72 | 1.018 |
| E-4 | 0.085 | 0.31 | 0.503 | 0.58 | 0.615 |
| E-5 | 0.080 | 0.077 | 0.26 | 0.266 | 0.496 |
| E-66 | 0.215 | 0.338 | 0.466 | 0.782 | over 39.0 |
| E-67 | 0.133 | 0.241 | 0.637 | 0.745 | 2.44 |
| E-68 | 0.17 | 0.40 | 0.35 | 0.72 | 1.86 |
| E-69 | 0.059 | 0.178 | 0.113 | 0.47 | 0.69 |
| E-70 | 0.02 | 0.155 | 0.397 | 0.567 | 0.56 |

HARDNESS, ABRASIVE WEAR

TABLE 4-continued
HARDNESS AND WEAR PROPERTIES OF EXPERIMENTAL ALLOYS

| ALLOY NO. | ROCKWELL | VOLUMES (mm³) |
|---|---|---|
| E-1 | Rb 52 | 123 |
| E-2 | — | — |
| E-3 | Rb 90 | 79 |
| E-4 | Rc 35 | 50 |
| E-5 | Rc 42 | 19 |
| E-66 | Rb 59 | 108 |
| E-67 | Rb 65 | 108 |
| E-68 | Rb 70 | 95 |
| E-69 | Rb 95 | 80 |
| E-70 | Rb 82 | 98 |

TABLE 5
ENGINEERING PROPERTIES OF ALLOY E-N-1 AND ALLOY C-1

|  | ALLOY E-N-1 | | ALLOY C-1 | |
|---|---|---|---|---|
|  | TIG | OXYACET-YLENE | TIG | OXYACET-YLENE |
| Charpy Impact | 2 ft/lbs | 3 ft/lbs | 4 ft/lbs | 2 ft/lbs |
| Abrasve Wear (mm³) | 17 | 12 | 46 | 6 |
| Adhesive Wear (mm³) | | | | |
| 30 lb. load | 0.03 | 0.06 | NT* | 0.24 |
| 90 lb. load | 0.08 | 0.12 | NT* | 0.23 |
| 150 lb. load | 0.17 | 0.18 | NT* | 0.61 |
| 210 lb. load | 0.29 | 0.31 | NT* | 0.62 |
| 300 lb. load | 0.63 | 0.36 | NT* | 0.81 |
| Hardness (kg/mm²) | DIAMOND PYRAMID HARDNESS | | | |
| At Room Temp. | 400 | 463 | NT* | NT* |
| At 800° F. | 365 | 357 | 510 | 475 |
| At 1000° F. | 310 | 342 | 465 | 440 |
| At 1200° F. | 185 | 230 | 390 | 380 |
| At 1400° F. | 95 | 115 | 230 | 260 |

*NT = Not Tested

TABLE 6
CORROSION DATA FOR SELECTED ALLOYS
CORROSION RATES in Mils Per Year (MPY)

|  | ALLOY F-N-1 | | ALLOY C-1 | |
|---|---|---|---|---|
| Media (Acids) | Oxyacet-ylene | TIG | Oxyacet-ylene | TIG |
| 30% acetic (boiling) | 36.6 | 55 | ND* | 6.7 |
| 5% sulfuric (66° C.) | 359 | 682 | ND* | 2110 |
| 65% nitric (66° C.) | 3 | 16 | ND* | ND |
| 50% phosphoric (66° C.) | <1 | 300 | ND* | ND |

*ND - No Data

Table 3 presents compositions of a series of experimental alloys. Alloys E-4, E-5 and E-N-1 are alloys of this invention. In Table 3, the values of "about 0.1% carbon," "about 0.25% silicon" and "about 0.03% boron" are approximations of contents. The elements carbon, silicon and boron were present at about the contents indicated. Subsequent analyses for similar alloys have indicated these values to be an accurate approximation.

The hardness testing was conducted with the use of the wellknown Rockwell testing machines. The hardness has been obtained in the Rockwell "B" and "C" scale, for room temperature hardness tests.

The abrasive wear test, as discussed herein, was conducted with the use of a dry sand wear test unit as described in the "ASME 1977 Proceedings", Wear of Materials, Page 77, ASME, 345 East 47th St., New York, N.Y. 10017. Briefly, in this test, the specimen is forced against a rotating rubber wheel while dry sand is fed between the specimen and the wheel. Metal loss from the specimen surface is measured to determine wear characteristics. The standard test covered 4720 sliding feet.

The adhesive wear test, as discussed herein, was performed on a Model LFW-1 Friction and Wear Test Machine manufactured by Fayville-LaValley Corporation, Downers Grove, Ill. The test is described in ASTM Specification No. D-2714-68. This testing process was originally known as the "Dow Corning" Wear Test. The adhesive test relates essentially to metal-to-metal wear. Briefly, in this test, a specimen (block) is forced under various loads against a rotating metal wheel (ring). Metal loss from the wear surface is an indication of the metal-to-metal wear characteristics of the alloy tested.

Table 4 presents test data obtained with specimens of the experimental alloys listed in Table 3.

Note the hardness for the alloys of this invention (alloys E-4, E-5 and E-N-1) are higher than the hardness of the other experimetal alloys. Because of the higher hardness, it was necessary to make the readings of the Rockwell "C" scale for these alloys. All readings on the Rockwell "B" scale indicate a lower hardness value.

Table 4 also discloses wear test results of the adhesive wear test at various load levels and the abrasive wear test. These values are given in loss of volume in mm³ units. The larger the volume loss, the more severe the wear.

It is apparent that the wear resistance is especially significant at the higher load levels of the adhesive wear test. Alloys E-4 and E-5 are more resistant to adhesive wear when compared to the other alloys to an outstanding degree.

Table 4 also prevents data indicating the alloys of this invention, alloys E-4 and E-5, are superior over the other experimental alloys in the abrasive wear test.

A series of tests were completed for the alloy of this invention, alloy E-N-1, and the prior art alloy C-1. The density of alloy E-N-1 was determined to be 7.51 grams per cubic inch. The density of alloy C-1 was determined to be 8.73 grams per cubic inch.

Hardfacing deposits were made from the prior art, alloy C-1, and the alloy of this invention, alloy E-N-1. The deposits were made by tungsten inert gas (TIG) and by oxyacetylene methods.

In Table 5, the Charpy impact data for these alloys, when deposited by TIG and oxyacetylene, show no significant difference. The alloy of this invention does not appear to lose any impact resistance when compared to the prior art alloy C-1.

In the abrasive wear test, as shown in Table 5, the TIG deposited alloy E-N-1 is far superior over the TIG deposited alloy C-1. The oxyacetylene deposited alloy C-1 appears to be only slightly better than alloy E-N-1.

In the adhesive wear test, as shown in Table 5, the oxyacetylene deposited alloy E-N-1 is superior over the alloy C-1. No testing was completed for the TIG deposited alloy C-1; however the TIG deposited alloy E-N-1 is superior over the oxyacetylene deposited alloy C-1 at every load level.

In a series of tests, multi-layers of deposits were made each by TIG and oxyacetylene welding processes with alloy E-N-1 and alloy C-1. The hardness for TIG and oxyacetylene with alloy E-N-1 were Rc37 and Rc38 respectively. The hardness for TIG and oxyacetylene with alloy C-1 were Rc55 and Rc53 respectively.

Alloy E-N-1 and C-1 were tested for resistance to corrosion resistance in various media. The corrosion data are presented in Table 6. These data show alloy E-N-1 to be superior over alloy C-1 in the sulfuric acid test and alloy C-1 to be better than E-N-1 in acetic acid test. Resistance to nitric and phosphoric acids is outstanding for alloy E-N-1. These data show alloy E-N-1 has excellent resistance to a variety of acid media.

What is claimed is:

1. A nickel-base alloy consisting essentially of, in weight percent, 35 to 50 chromium, 2.5 maximum molybdenum plus tungsten, 0.65 to 3 boron, 0.1 to 1.0 carbon, 3 to 5 silicon, 5 maximum iron, 7.5 maximum cobalt, 4 maximum total content of vanadium, tantalum, columbium, titanium and manganese, up to 2.5 copper, and the balance nickel plus incidental impurities.

2. The alloy of claim 1 having a minimum hardness of Rockwell C-36.

3. The alloys of claim 1 wherein the ratio of chromium to nickel is limited within the ratios of 1 to 1.25 and 1 to 0.75 respectively.

4. The alloy of claim 1 wherein the total content of boron, carbon and silicon does not exceed about 7.5%.

5. The alloy of claim 1 consisting essentially of, in weight percent, 42.5 to 47.5 chromium, 1 maximum molybdenum plus tungsten, 1.2 to 2.5 boron, 0.3 to 0.45 carbon, 3 to 5 silicon, 4 maximum iron, 5 maximum cobalt, 3 maximum total content of vanadium, tantalum, columbium, titanium and manganese, up to 2.5 copper, and the balance nickel plus incidental impurities.

6. The alloy of claim 5 having a minimum hardness of Rockwell C-36.

7. The alloy of claim 5 consisting essentially of, in weight percent, about 45 chromium, 1 maximum molybdenum plus tungsten, about 1.85 boron, about 0.4 carbon, about 3.5 silicon, 4 maximum iron, 5 maximum cobalt, 3 maximum total content of vanadium, tantalum, columbium, titanium and manganese, up to 2 copper, and the balance nickel plus incidental impurities.

8. The alloy of claim 7 having a minimum hardness of about Rockwell C-36.

9. A casting made from the alloy of claim 1.

10. An article for producing hardfacing deposits made from the alloy of claim 1.

* * * * *

UNITED STATES PATENT OFFICE
CERTIFICATE OF CORRECTION

Patent No. 4,181,523  Dated January 1, 1980

Inventor(s) Kirit J. Bhansali

It is certified that error appears in the above-identified patent and that said Letters Patent are hereby corrected as shown below:

On the title page, "[76] Inventor" should read --[75] Inventor -- followed by -- [73] Assignee: Cabot Corporation, Kokomo, Indiana --
Following "Primary Examiner - R. Dean" add -- Attorney, Agent, or Firm - Joseph J. Phillips; Jack Schuman --
Column 4, line 68 delete "HARDNESS, ABRASIVE WEAR"
Column 5, line 24, Table 5 "Abrasve" should read --Abrasive--
In the specification, column 5, line 44, Table 6, "F-N-1" should read --E-N-1--
Column 6, line 42, "prevents" should read -- presents --
Column 6, line 48, "cubic inch" should read -- cubic centimeter --
Column 6, line 49, "cubic inch" should read -- cubic centimeter --
In the claims, claim 3, first line, "alloys" should read -- alloy --

Signed and Sealed this

Twenty-fourth Day of June 1980

[SEAL]

Attest:

Attesting Officer

SIDNEY A. DIAMOND

Commissioner of Patents and Trademarks